UNITED STATES PATENT OFFICE.

BRUNO TERNE, OF PHILADELPHIA, PENNSYLVANIA.

PROCESS OF MAKING FERTILIZERS.

SPECIFICATION forming part of Letters Patent No. 646,716, dated April 3, 1900.

Application filed December 6, 1899. Serial No. 739,384. (No specimens.)

*To all whom it may concern:*

Be it known that I, BRUNO TERNE, a citizen of the United States, residing in the city of Philadelphia, in the county of Philadelphia and State of Pennsylvania, have invented certain new and useful Improvements in Processes of Making Fertilizers from Animal Excreta, of which the following is a specification.

This invention relates to an improved process of treating manure and urine of cattle and other animals in such a manner as to utilize the ammonia contained in the same in the form of its salts for producing a high-grade fertilizer.

In the cattle-fattening stables of the great whisky and other distilleries in the Western States large quantities of manure accumulate. Thousands of head of cattle are confined in the stables, and the manure and urine from the same go to waste, as owing to the large quantity they could not be utilized. The urine was allowed to run off into the sewers, and the solid excrements were by use of a large surplus of water disposed of in the same way. The latter, however, by reason of its great quantity oftentimes collected at the mouth of the sewer or settled upon the river-banks and created a nuisance.

The object of this invention is to utilize both the liquid and solid excreta for the production of a high-grade fertilizer rich in ammonia; and the invention consists of the process for this purpose which comprises the following steps: collecting the urine, separating the liquid matter from the solid excrements by pressure, mixing the urine with the expressed liquid matter, permitting the combined liquids to stand until putrefied, subjecting the putrefied liquids to distillation, so as to obtain its contained ammonia in the form of its salts, and, lastly, mixing the so-obtained ammonia compounds with the solid matter.

In practically carrying out my improved process for treating manure and utilizing the ammonia contained therein the urine is collected in suitable tanks. The solid excrement, which contains a certain quantity of liquid-matter, is collected from the stable-floors and subjected to pressure in a system of presses, so as to separate the contained liquid from the solid matter, and the latter then dried. Cattle manure, such as is produced in the stables of the large distillers, contains about forty-five per cent. solid and fifty-five per cent. liquid matter. The liquid matter obtained from the solid excrement is added to the urine in the storage-tanks. The entire volume of liquid matter is then permittd to stand until putrefaction has set in and a condition is reached where a maximum yield of ammonia can be obtained by distillation. It is then subjected to distillation.

The solid matter after being removed from the presses is then mixed with a solution of ammonia sulphate, phosphate, muriate, or nitrate, as produced by the absorption of the ammonia by distillation of the liquid matter, in such proportions that a high-grade commercial fertilizer is obtained, which contains from eight to sixteen per cent. of ammonia. This mixture is then dried in driers of suitable construction, so that a dry fertilizer is obtained which is equal in fertilizing properties to the better grades of Peruvian guano or similar fertilizers. The ammonium compounds may first be obtained from their solutions in powder form and mixed in this form with the solid matter; but it is preferable to mix the solution of ammonium compounds with the solid matter and then dry the entire mass.

My improved process is of great advantage for distillers and others engaged in any business in the course of which cattle are fed in stables and permits of the disposal of the large accumulation of excrements and urine in a very advantageous manner, for the reason that the ammonia contained in the liquid matter is regained and the same, with the solid matter, utilized as a valuable fertilizer. As all excrements and urine of other domestic animals contain a greater or less quantity of ammonia compounds, it is obvious that the process described may be employed for treating manure from other animals than cattle.

Having thus described my invention, I claim as new and desire to secure by Letters Patent—

The process herein described of making fertilizers from animal excreta, which consists in collecting the urine, separating the liquid matter from the solid excrements by pressure, mixing said liquid matter with the separatelycollected urine, permitting the combined liquids to putrefy, subjecting the putrefied liquids to distillation for obtaining the ammonia contained therein in the form of its salts, and mixing said ammonium salts with the solid matter, substantially as set forth.

In testimony that I claim the foregoing as my invention I have signed my name in presence of two subscribing witnesses.

BRUNO TERNE.

Witnesses:
PAUL GOEPEL,
J. H. NILES.